June 25, 1957     J. S. DA COSTA     2,796,975
CONVEYOR DRIVE

Filed Oct. 1, 1952     5 Sheets-Sheet 1

Inventor
James Starr Da Costa
by Parker & Carter
Attorneys

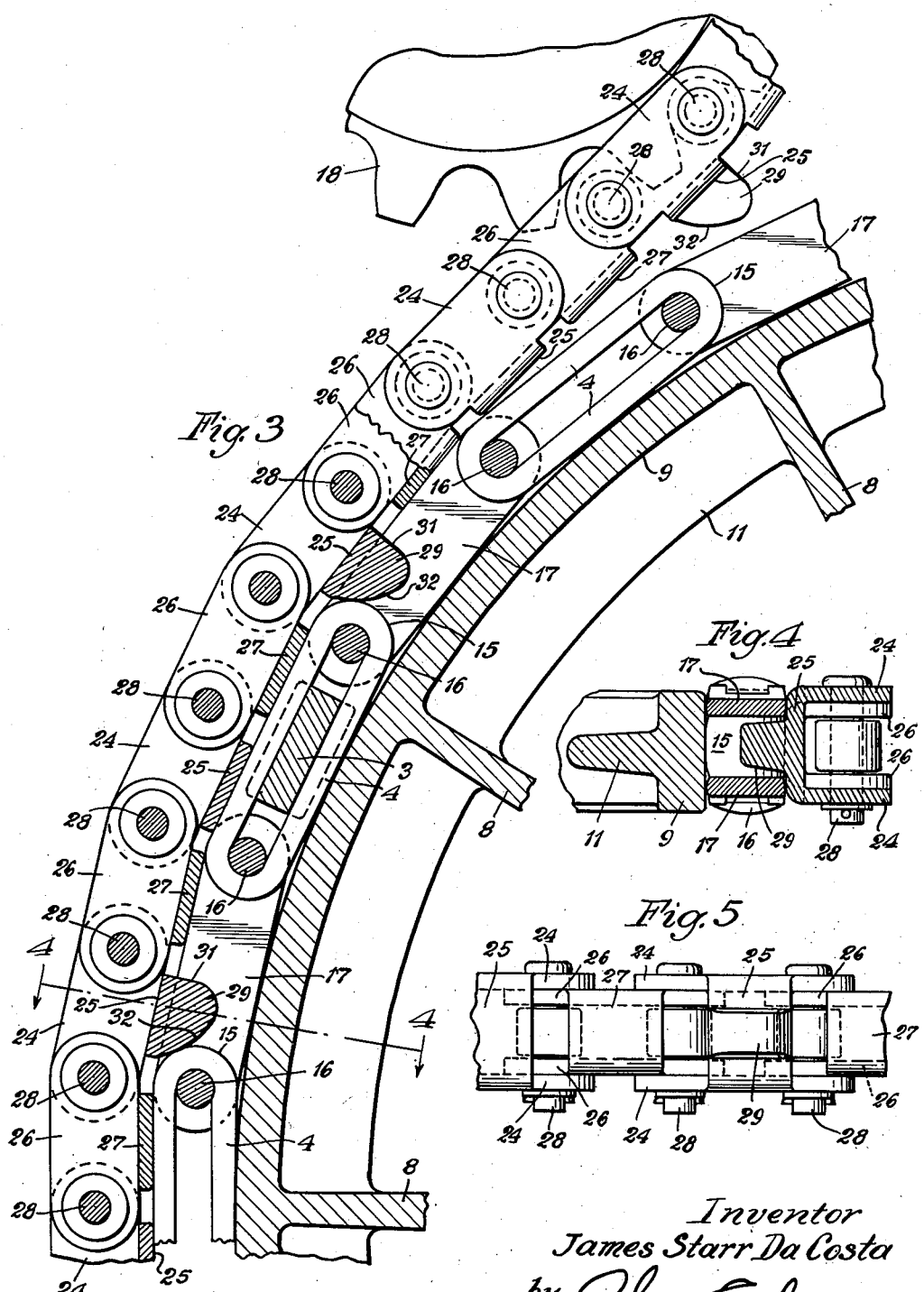

June 25, 1957

J. S. DA COSTA 2,796,975

CONVEYOR DRIVE

Filed Oct. 1, 1952

Inventor
James Starr Da Costa
by Parker & Carter
Attorneys

June 25, 1957 J. S. DA COSTA 2,796,975
CONVEYOR DRIVE
Filed Oct. 1, 1952 5 Sheets-Sheet 4
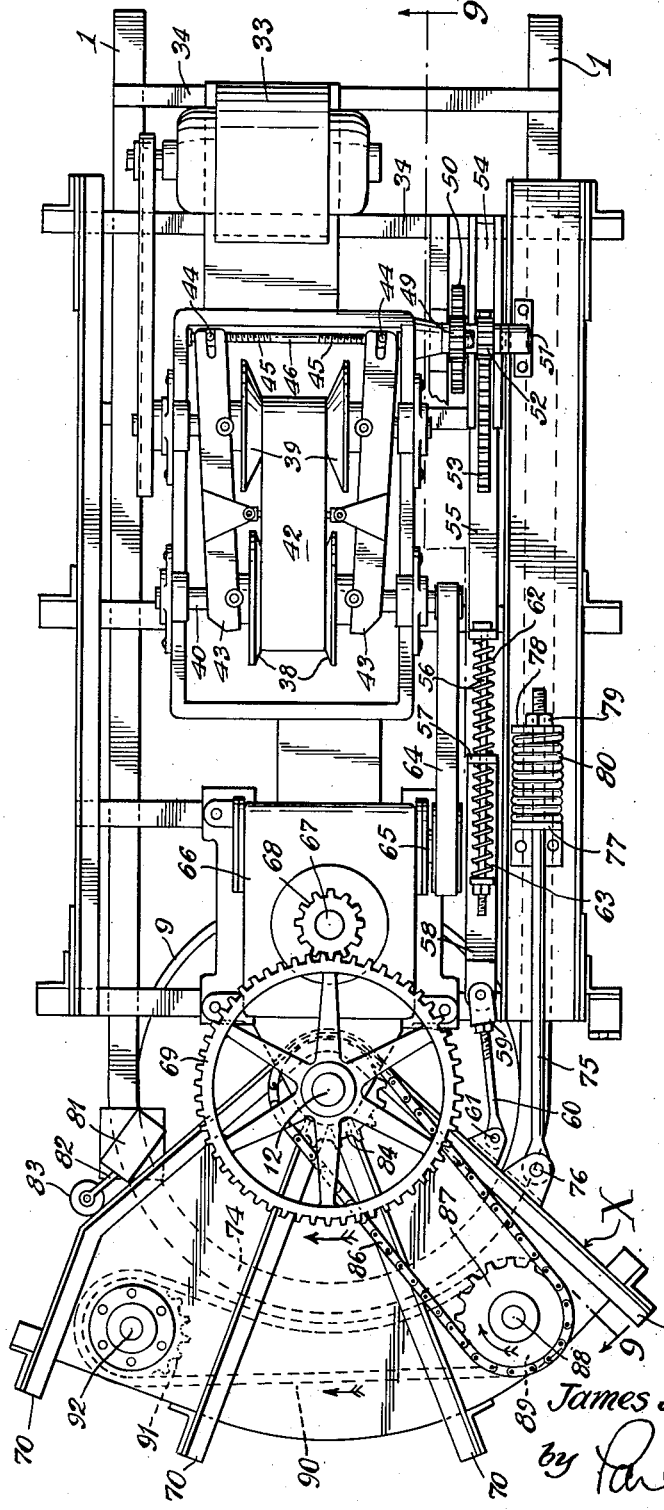
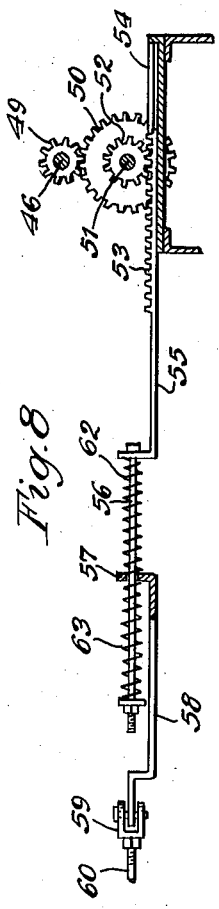
Inventor
James Starr Da Costa
by Parker & Carter
Attorneys June 25, 1957
J. S. DA COSTA
2,796,975
CONVEYOR DRIVE
Filed Oct. 1, 1952
5 Sheets-Sheet 5
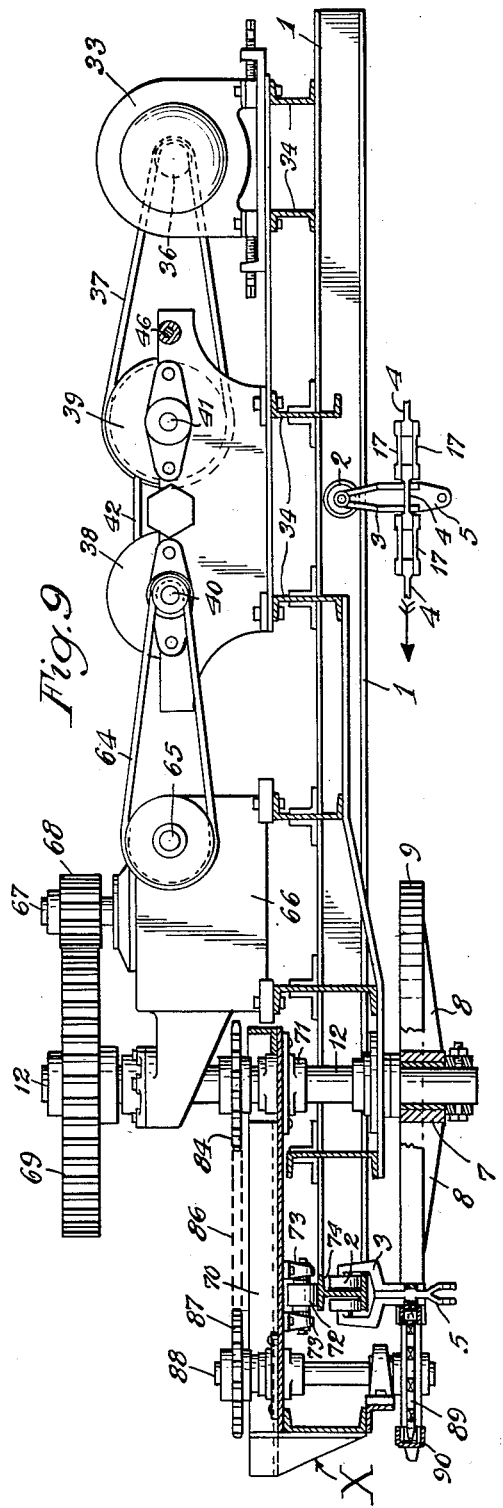
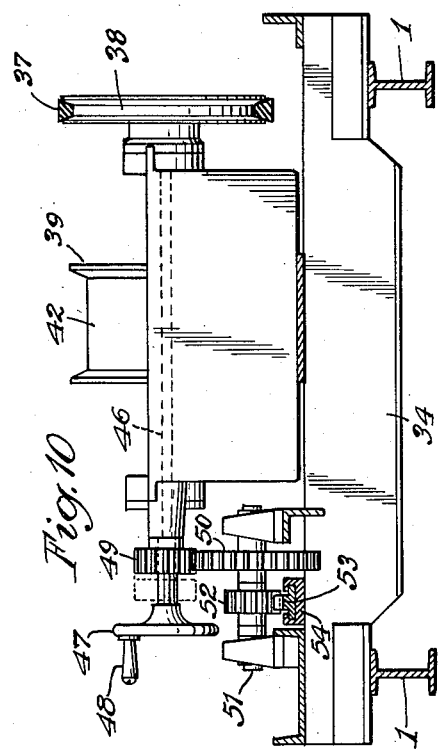
Inventor
James Starr Da Costa
by Parker & Carter
Attorneys 2,796,975
Patented June 25, 1957

2,796,975
CONVEYOR DRIVE

James Starr Da Costa, Merchantville, N. J., assignor to Samuel Olson Mfg. Company, Inc., Chicago, Ill., a corporation of Illinois Application October 1, 1952, Serial No. 312,607

11 Claims. (Cl. 198—203)

This invention relates to a drive and primarily to a driving means and assembly for driving a conveyor.

It has for one object to provide an improved drive for an overhead chain conveyor. Such drives are currently referred to as "Caterpillar drives."

Another object of the invention is to provide in a drive for a chain conveyor means rendering unnecessary the use of "back-up rollers" on the outside of the drive chain and on the inside of the driven chain. In other words, an object of the invention is to eliminate the necessity of "back-up rollers" anywhere in the drive.

A still further object is to provide, in connection with the drive of the general type indicated, means whereby the driven chain is held against an idler wheel or roller through the tension of the driving chain and thus the wheel against which the driven chain is held may be considered as a roller having a radius several times that of the conventional "back-up rollers" now in use.

Another object is to provide means for engaging the driving chain with the driven chain in such manner that any excess load on the driven chain will merely push the driving chain away from the driven chain without damage to either.

A still further object is to provide engaging means between the driving and driven chain of such construction that adequate driving effort is imparted to the driven chain, and having the further advantage that upon the occurrence of excess load on the driven chain the separation above mentioned will readily occur without damage.

Other objects will appear from time to time in the course of the specification and claims.

The invention is illustrated more or less diagrammatically in the accompanying drawings, wherein:

Fig. 3 is an enlarged sectional view with parts in elevation showing on an enlarged scale a portion of the contacting area between the driving and the driven chain;

Fig. 4 is a sectional detail taken at line 4—4 of Fig. 3; and

Fig. 5 is an elevation illustrating the driving face of the driving chain;

Fig. 7 is a diagrammatical plan view of the form of Fig. 6 in a different position;

Fig. 8 is a fragmentary side elevation of the speed adjusting means of Fig. 7;

Fig. 9 is a section with parts omitted and parts in elevation taken at line 9—9 of Fig. 7; and Fig. 10 is a transverse section taken at line 10—10 of Fig. 6.

Like parts are designated by like characters throughout the specification and drawings.

The device of the present invention comprises generally a driven chain, means for supporting it and means for driving it. It is supported preferably from overhead.

Figure 2:
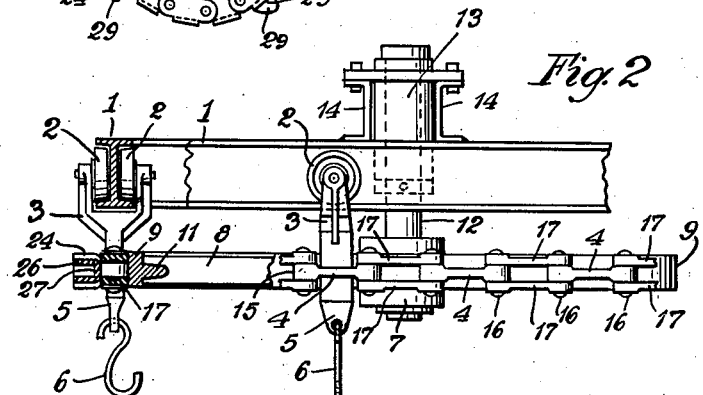
Fig. 2 is a sectional detail taken at line 2—2 of Fig. 1.

In the particular form here shown, the chain is a so-called trolley chain supported from a track 1 by trolley wheels 2 carried in yokes 3 which extend to and are secured within chain links 4. Beneath the chain links 4 there may be provided eyes 5 suitable to receive hooks 6 or other means for carrying a load from the chain. The driven chain will be described more in detail below. The track 1, as shown generally in Fig. 2, is formed of I-beams but it may be of other shapes so long as track portions are provided to receive and support the rollers 2 and to permit them to be rotated as they run along the tracks.

The driven chain is supported by and in contact with a roller or wheel which, as shown, comprises a hub portion 7, spokes 8, and external tire or working face-forming portion 9, reinforcing webs 10 adjacent the hub 7 and reinforcing webs 11 adjacent the outer member 9. The hub 7 has fixed to it a shaft 12 which is carried within a bearing 13. The bearing may be mounted on any suitable support. As shown here, it is carried by frame members 14. The particular details of the bearing support for the wheel form no essential part of the invention and any type of bearing and wheel support may be used as desired.

The driven chain comprises generally links of two types joined by pintle pins. As shown, the links which carry and receive the yoke members 3 are provided with end-bearing portions 15 which are joined by pintle pins 16 to side bars 17, 17 of the adjacent 2-part links. The particular details of fastening and of link design embodied in the link driven chain are not illustrated in full because they form no essential part of the invention.

The invention may be embodied in and its teachings may be carried out in a chain of almost any design consistent with the weight, load, and power requirements for the particular installation involved. Generally, the driven chain will be an articulated metal chain arranged to engage the yokes or yoke supports by means of which the chain is itself supported from a track system positioned above it. The driven chain is endless and passes about a wheel or roller at its opposite end substantially like that shown in Fig. 1 generally and in detail in Fig. 3. The conveyor system may, of course, change in direction and other requirements as a result of which the driven chain may be engaged with and pass about any desired number of wheels or rollers comparable to the member shown in Fig. 1. The invention is, therefore, not limited to any particular idler wheels or rollers and may be embodied in a wide variety of particular arrangements and installations.

Figure 1:
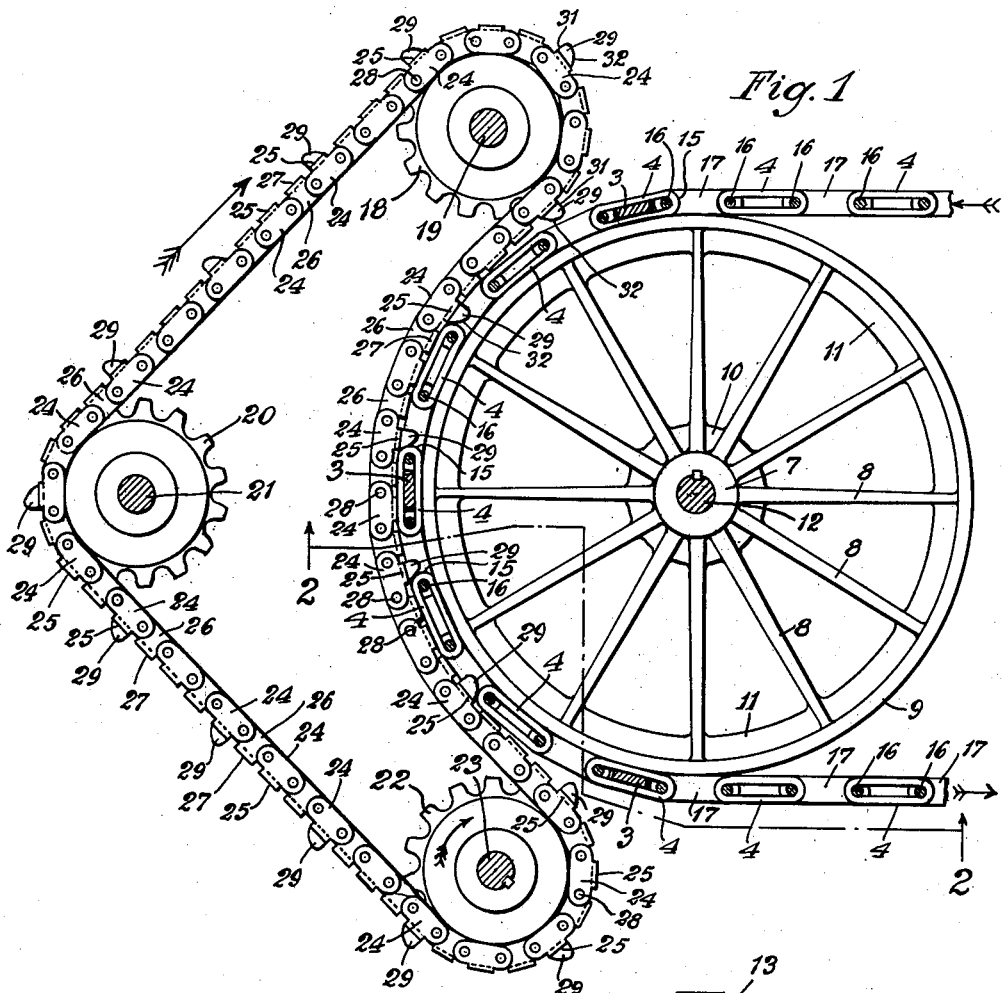
Fig. 1 is a plan view of one form of the device illustrating the driving end of the assembly with some parts in section.

The driving chain comprises also an endless chain and is shown generally in Fig. 1 and in greater detail on an enlarged scale in Figs. 3, 4 and 5. The driving chain is preferably positioned about three sprockets, as shown in Fig. 1. In this installation, there is a take-up sprocket 18 arranged upon a shaft 19 and equipped with or connected to take-up mechanisms so that it may be moved to adjust the tension in the driving chain to the desired degree and to take up slack or otherwise modify conditions in the driving chain. An idler sprocket 20 carried by shaft 21 is positioned in the system and in engagement with the driving chain. A driving sprocket 22 carried by a shaft 23 is positioned in the system and is connected to a driving mechanism or means, not shown, by means of which the driving sprocket is driven to operate the driving chain when desired and at appropriate speeds. The driving means, as such, are not illustrated since they form no essential part of the invention. They may be embodied in a system driven by many different sorts of drives.

The driving chain generally comprises an articulated chain normally intended to be formed of metal and the driving chain is formed of links, some of which carry dogs arranged to engage the driven chain. These dogs may engage a chain link of the driven chain or they may engage pintles of the driven chain or any other desirable part so long as there is sufficient engagement between the driving and driven chain to transmit the driving effect.

In the particular form shown, the driving chain comprises links formed of side bars 24, 24 and integral joining parts 25. As shown in Figs. 4 and 5, the side bars 24 embrace the side bars 26 of adjacent links and these side bars 26 are connected by integral transverse members 27. Pintle pins 28 join the several links of the driving chain to each other for articulation. To the integral joining parts 25 of the driving chain are secured dogs 29. These constitute driving dogs or means and interfit with the driven chain. As shown particularly in Fig. 3 on an enlarged scale, the dogs 29 contact the bearing portions 15 of chain links 4. Obviously, while this is a convenient and efficient feature of the device, it is not one to which the invention is limited. Each dog 29 is provided with a relatively steep face 31 and a relatively flatter or inclined face 32. The face 32 is the driving face and it is of such shape and contour that upon the occurrence of excessive load on the driven chain it "rides up" on whatever part of the driven chain it may be in contact with and thus prevents breakage and damage of the parts. As shown particularly in Figs. 1 and 3, ordinarily there will be more links in the driving chain without dogs than with dogs. The number of links in the driving chain with dogs depends upon the particular design of the particular installation. There will normally be enough dogs present to provide adequate engagement between the driving and the driven chain to accomplish proper driving of the driven chain.

As shown in Fig. 5, some of the links which are formed by the side bars 24 and the integral cross parts 25 are formed without the dogs 29. Such a link appears at the left of Fig. 5 and such links also appear in Figs. 1 and 3.

In the modified form of Figures 6 to 10 inclusive the basic thought embodied in the form of the first five figures is retained with modifications and amplifications. The conveyor chain formed of the links 4 and 17 is the same as that shown in the earlier figures and it is driven by a driving chain which is positioned about the main driving pulley and particularly about the working face or portion 9 of that pulley. The driving chain is positioned outside of the conveyor chain and bears against it and contacts it in the manner shown generally in Figure 1 and in detail in Figure 3. Instead of two idler sprockets, the driving chain is provided with only one idler sprocket and with one driving sprocket.

The driving chain is mounted on a quadrant or other supporting frame which is itself mounted for movement. It may move under the influence of excessive load and this movement may merely cushion the drive and prevent damage due to excessive load, or it may adjust the speed of the drive and finally it may stop the drive. Means for this speed adjustment and for stopping the drive appear in the modified form illustrated in Figures 6 to 10 inclusive.

In the form of these figures, the power source for driving and for speed adjustment is shown. A similar arrangement may be used in connection with the earlier figures. The driving means of either form of the device may be substantially conventional. It is convenient generally to provide a driving source and means for adjusting the speed of the drive. Such devices are generally known in the art and no claim is made to the novelty of the driving means or the conventional speed varying means shown particularly in Figure 6. The combination of these means with the other features illustrated in Figures 6 to 10 inclusive constitute a portion of the novelty of the present construction.

The driving means comprises an electric motor 33 carried on suitable supports 34—34 which are themselves carried on other frames or supports 1—1. The motor is provided with a pulley 36 which, by means of a belt 37, drives a pulley 38 of a variable speed drive which may be of conventional type. As shown, it includes pairs of beveled pulleys 38 and 39, slidably mounted respectively on shafts 40 and 41. A flexible member 42, such as a belt, engages the roughened driving surfaces of the members 38 and 39 and is of fixed length. The members 38 and 39 are moved for adjustment by arms 43—43 which engage members 44 in threaded engagement with oppositely threaded portions 45 of an adjusting shaft 46.

The adjusting shaft 46 may be rotated for adjustment by a hand wheel 47 which appears in Figure 10 and which may include a handle 48. The shaft 46 also carries a pinion 49 which meshes with a gear 50 on an adjusting shaft 51. On this shaft is also mounted a pinion 52 which meshes with a slidably mounted rack 53. Movement of the rack rotates the pinion 52 and through it the shaft 51 and through the gears 50 and 49 rotates the adjusting shaft 46 to move the members 43 to adjust the pulley elements 38 and 39.

Figure 6:
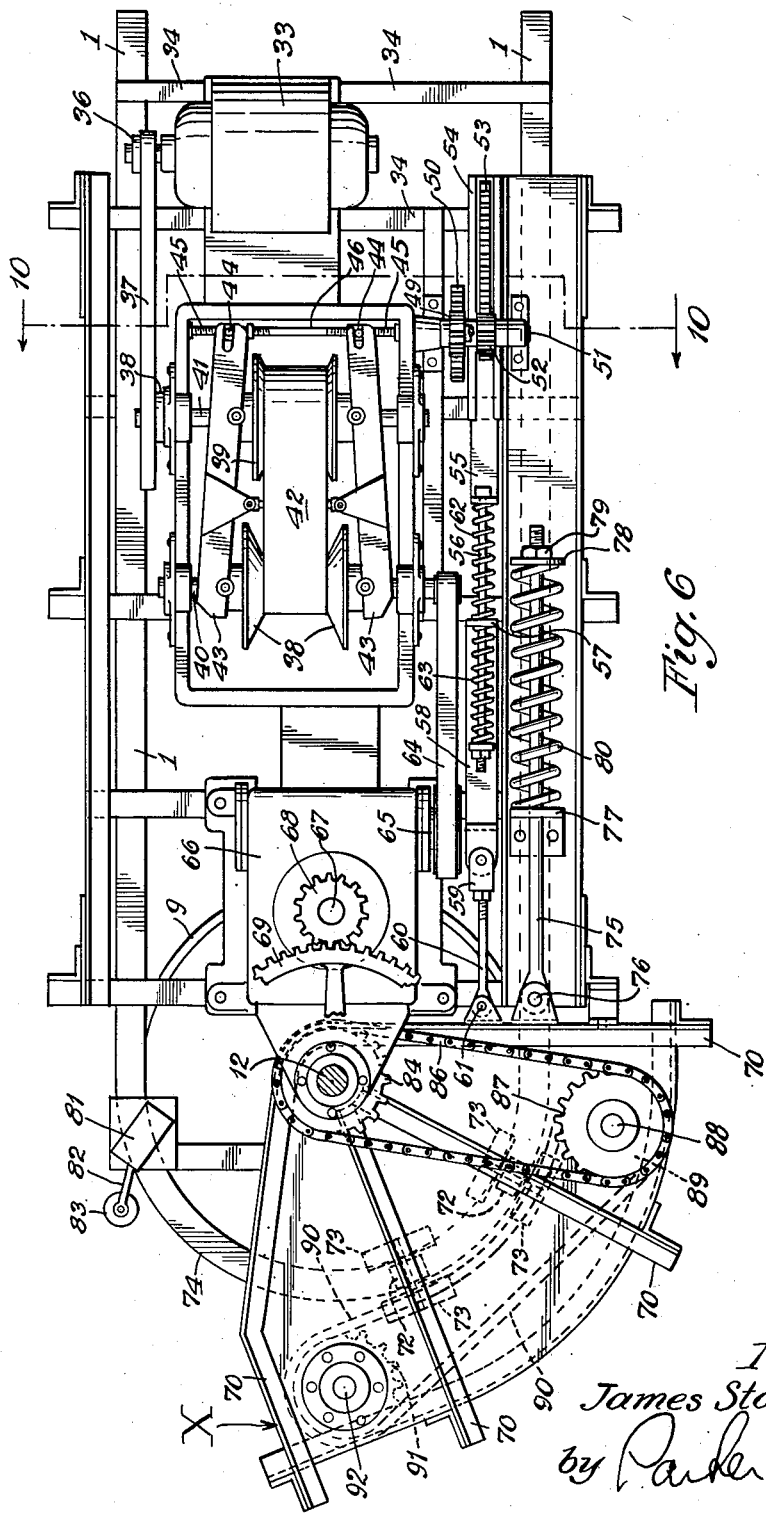
Fig. 6 is a plan view of a modified form.

The parts are shown at one position of adjustment in Figure 6 and at an opposite position of adjustment in Figure 7. The automatic adjusting assembly is shown in diagrammatic elevation in Figure 8. The rack is mounted for sliding in a suitable track as indicated at 54 and the rack is mounted upon or attached to a slidable member 55 which carries a rod-like member 56. This member passes through an eye formed in the up-turned portion 57 of a connecting link 58. The link is fastened to a connection 59 which by means of a rod 60 and a pivotal connection 61 joins the speed adjusting means to the quadrant which is formed of a plurality of members and is indicated generally by the letter "X."

Positioned also in the speed adjusting means is a pair of springs 62 and 63.

The shaft 40 by means of a belt 64, or other suitable connection, drives a shaft 65. Through speed reduction gearing not shown and contained in the housing 66 the shaft 67 carrying the pinion 68 is driven. The pinion 68 meshes with the gear 69 on the shaft 12. The precise details of the bearings and supporting means for the shaft 12 and the wheel comprising the working face 9 and other parts positioned to rotate about the shaft 12 are not described in full because they form no essential part of the present invention which may be embodied in a structure including a wide variety of such structural details. The conveyor chain including the links 4 and 17 is positioned about the working face 9 as shown in Figures 2 and 9.

As above mentioned, the so-called Caterpillar drive, by means of which the conveyor chain is driven, is mounted for support in a quadrant designated generally by the letter "X." This quadrant comprises frame members 70—70 which are secured to a hub-like member 71 positioned for rotation about the shaft 12. Two or more rollers 72 are positioned on bearings carried by supports 73 which are themselves fixed to frame members 70. The rollers 72 may bear upon and move along a curved section 74 of the track 1 upon which the trolleys 2—2, described below, are arranged to run. The quadrant frame is thus positioned about the center of the shaft 12 for limited rotation with respect to that shaft. This rotation may occur because of excess loading on the conveying chain.

A link 75 is secured as at 76 to the quadrant "X" being mounted in the particular form here shown upon one of the frame members 70. The link passes through a stirrup 77 and carries at its outer end a plate or abutment 78 adjustably held in place by a nut 79. A spring 80 is positioned about the link 75 between the member 77 and the member 78. This spring is positioned to resist yieldably the movement of the quadrant in a clockwise direction from the position shown in Figure 6 to the position of extreme movement shown in Figure 7.

The limit switch is mounted in a housing 81 and is operated by an arm or similar member 82 which extends from the housing 81 and is provided with a contact part 83 which as shown in Figure 7 has been contacted by the quadrant, in particular by the outermost frame member 70. The movement of the quadrant in the clockwise direction has moved the limit switch operating arm 82 from the position of Figure 6 to that of Figure 7. This movement will normally be sufficient to operate the switch within the housing 81 and to break the circuit by which the motor 33 is driven and thus to stop the drive.

Fixed upon the shaft 12 is a driving sprocket 84. About this sprocket is positioned a driving chain 86 which meshes with a sprocket 87 and drives it when the shaft 12 is rotated. The sprocket 87 is mounted on a shaft 88 carried in suitable bearings in the quadrant assembly.

At its lower end the shaft 88 carries a second sprocket 89 about which is positioned a driving chain 90. This chain meshes with an idler sprocket 91 carried upon a shaft 92 which has suitable supports in bearings themselves carried by the quadrant assembly. A drive chain 90 is engaged with the sprockets 89 and 91 as shown in plan in Figure 6. This driving chain is generally the equivalent of the driving chain shown in Figures 1 and 2. It bears against and is engaged with the conveyor chain formed of the members 4 and 17. It differs from the chain of the earlier figures primarily by the fact that it has only a single idler sprocket whereas the chain of Figure 1 has two idler sprockets. In each case the driving chain is positioned about and in contact with the conveyor chain, engages it, holds it against the surface 9 and drives it.

The use and operation of the invention are as follows:

In the general form shown, the device of the present invention is intended primarily for use in connection with the drive of a conveyor chain. The conveyor chain is supported from above by means of trolleys which engage and run upon track members of almost any suitable design. Systems of the type mentioned generally comprise what are known as outboard and inboard ends or portions. The inboard side or end will frequently be that adjacent a point of loading or unloading. Many conveyors may be embodied in a system in which a central or inboard end of each of several conveyors is closely associated with a central or inboard end of other conveyors and normally the driving elements will be located in the inboard end or side of the loop. Thus, for convenience it will probably be found preferable to locate the driving chain of the present invention at the inboard end of the device.

When the device is in operation, the driving chain will be driven from any suitable source of power at any desired speed. The driving sprocket 22 will rotate in the direction of the arrow of Fig. 1 and the driving chain will be driven in the direction of the arrow of that figure corresponding to the driven chain in the direction of the arrows shown in Fig. 1 adjacent the driven chain. As the chains are thus driven, the trolleys 2 run about track or tracks 1 and support the driven chain and its load. Means, such as, for example, the members 5 and 6, may be provided for supporting, usually removably, any reasonable load.

Should excess load develop on the driven chain or should, for any reason, conditions develop which resist beyond a predetermined limit the movement of the driven chain in the driven direction, then automatically the driving chain is pushed away from the driven chain by reason of the "camming" action of the faces 32 of the dogs 29 and thus neither chain is broken nor damaged even though excess load is present in the system. If desired, a limit switch or other means may be associated with the "take-up sprocket" or with some other part of the driving system, particularly of the driving chain and its drives, which would act automatically in response to excess load on the driven chain to shut off the power of the drive. Such mechanism would thus operate automatically in response to tension set up on the driving chain as a result of the excess load on the driven chain.

A speed control means or a complete shut-off means may be provided to operate in response to the development of this condition. In the driving chain the pitch is such that it matches that of the driven chain when positioned on the curved section of the driven chain by the roller. At the same time, the driving chain is of smaller actual pitch, in one suitable installation the pitch being approximately 2 inches, which permits a small radius driving sprocket and thus reduces the torque requirement of the driven shaft and the reduction mechanism. Actually, the driving chain is of larger pitch than the driven chain in the form shown and this construction permits every two pitches of the driving chain to match exactly the pitch of the driven chain at the intersection of the center line of both chains and the extended radii of the roller. The roller about which the driven chain is positioned, as shown, is a traction wheel and is also a back-up element for the drive. There is no friction between it and the driven chain. There is also no friction between the driving chain and the roller since the driving chain is positioned and held against the driven chain by tension and is controlled by an automatic or a hand take-up mechanism fitted to the take-up sprocket.

The operation of the form of the device shown in Figures 6 to 10 inclusive is substantially the same as that described above so far as the drive problem is concerned. The conveyor chain is the same in both forms and it is positioned about the face 9 of the roller or wheel as shown in the earlier figures. The driving chain is in contact with a portion of the outside or exposed face of the conveyor chain as shown in the earlier figures. In the form of Figures 6 to 10 inclusive however instead of one driving sprocket for the driving chain and two idler sprockets there is shown a single driving sprocket and a single idler sprocket. The contact of the two chains of the driving action of one upon the other is the same as that described above in connection with the earlier figures and it need not be re-described.

The structure or layout as it appears in Figures 6 to 10 permits the greatest effort being extended to the conveyor chain with the least amount of work being expended by the driving chain and the less torque effort by the driving sprocket and the driving shaft 12 which appears throughout the figures.

The arrangement of the latter figures also provides means for accommodating an overload or unusual resistance which may occur on the conveyor chain. Such overload or unusual resistance might cause the driving chain to crawl clockwise around the conveyor chain. When this occurs the framework which carries the driving chain will move in a clockwise direction from the position of Figure 6 to that of Figure 7 against the resistance of the spring 80. When the unusual resistance on the conveyor chain or the overload upon it has been overcome the quadrant frame carrying the driving chain will move in a counterclockwise direction to the position of Figure 6. When the change-speed mechanism illustrated generally in Figure 6 and in diagram in Figure 8 is included in the assembly, movement of the quadrant frame in a clockwise direction will also be effective to alter the speed of the drive. It will, by moving the rack 53, rotate the pinion 52 and through the pinions and gears shown in Figures 6, 7 and 8, will rotate the adjusting shaft 46 to vary the position of the arms 43 and thus to vary the positions of the pulleys 38 and 39.

Thus when the quadrant moves in response to unusual resistance of over-load on the conveyor chain, the movement of the quadrant itself caused by the clockwise crawling of the driving chain will tend to relieve the condition caused by the overload and will further tend to relieve that condition by change of the speed of the drive.

Extreme movement in the clockwise direction brings a portion of the quadrant frame into contact with the member 83 of the limit switch and finally disconnects the motor and stops the drive. The quadrant frame carrying the driving chain is free to oscillate in both directions around the shaft 12 and its movement is resisted only by the action of the spring 80 which is designed to accommodate a certain normal chain pull and to prevent movement of the quadrant unless a pull in excess of a normal pull occurs in the driving chain.

In both forms of the device illustrated the driving chain is held against the conveyor chain without the use of "back up" rollers or other devices because holding the driving chain against the conveyor chain, the two chains are held in working position by the tension of the driving chain on the outboard side, and the driven chain; namely, the conveyor chain, rides against the large diameter of the wheel defined by the portion 9. The idler sprockets in both forms of the device are adjustable or may readily be made so.

When the driving chain and its supporting quadrant frame move in the clockwise direction to check the speed change, and thus to reduce the speed of the driving chain, an increased driving effort will occur. The spring arrangement comprising the spring 62 and 63, shown in the speed adjustment means, is present to avoid shock on the speed changing members and to cause a gradual position of the devices causing the change.

Although only one drive is shown in Figures 6 to 10, more than one drive may be used in a large chain circuit, and if any one of the drives is called upon to carry more than its load, its quadrant will oscillate and the chain speed in that particular drive will be reduced, thus throwing the excess load on the next adjacent drive. In that case all of the drives present in the system might move slightly to compensate for the movement or variation in position of the first drive in which movement occurs and all of the drives would then tend to carry approximately the same load.

I claim:

1. In combination, a conveyor and a drive therefor, said conveyor comprising a link chain, an idler pulley therefor, said conveyor being positioned about and in contact with said pulley, a driving chain for said conveyor chain, said driving chain being positioned in contact with said conveyor chain and being positioned in a curved line about said pulley, a driving sprocket, engaged with the said driving chain, said driving chain being formed of links, some of said links carrying projecting conveyor chain driving elements, one pitch of said conveyor chain being substantially equal to two pitches of said driving chain, said conveyor chain being held against said pulley by the driving tension in said driving chain.

2. In combination, a conveyor and a drive therefor, said conveyor comprising a link chain, a pulley therefor, said conveyor being positioned about and in contact with said pulley, a track, a plurality of trolleys engaged with said track and connected to said chain at spaced points, there being a link between each pair of trolley connections and a driving chain for said conveyor chain, said driving chain being positioned in contact with said conveyor chain and being positioned about said pulley, said conveyor chain and said driving chain being in contact only about said pulley, a driving sprocket engaged with the said driving chain, said driving chain being formed of links, some of said links carrying projecting conveyor chain driving elements, said driving elements having conveyor chain engaging faces rearwardly inclined with respect to the direction of travel of said driving chain.

3. In combination, a conveyor and a drive therefor, said conveyor comprising a link chain, an idler pulley therefor, said conveyor being positioned about and in contact with said pulley, a driving chain, said driving chain being positioned in contact with said conveyor chain and being positioned about said pulley through a substantial proportion of its circumference, said conveyor chain and said driving chain being in contact only about said pulley, a driving sprocket and a take-up sprocket engaged with the said driving chain and positioned to hold said driving chain against said conveyor chain, said driving chain being formed of links, some of said links carrying projecting conveyor chain driving elements, the driving effort applied to said conveyor chain being effected solely by engagement of said elements with said conveyor chain during movement of said driving chain, the driven conveyor chain being held against said pulley by the driving tension in said driving chain.

4. In combination, a conveyor and a drive therefor, said conveyor comprising a link chain, an idler pulley therefor, said conveyor being positioned about and in contact with said pulley, a track, a plurality of trolleys engaged with said track and connected to said chain at spaced points, there being a link between each pair of trolley connections and a driving chain for said conveyor chain, said driving chain being positioned in contact with said conveyor chain and being positioned about said pulley through a substantial proportion of its circumference, said conveyor chain and said driving chain being in contact only about said pulley, a driving sprocket and a take-up sprocket engaged with the said driving chain and positioned to hold said driving chain against said conveyor chain, said driving chain being formed of links, some of said links carrying projecting conveyor chain driving elements, said driving elements having conveyor chain engaging faces rearwardly inclined with respect to the direction of travel of said driving chain.

5. In combination, a conveyor and a drive therefor, said conveyor comprising a link chain, an idler pulley therefor, said conveyor being positioned about and in contact with a substantial proportion of the circumference of said pulley, a driving chain for said conveyor chain, said driving chain being positioned in contact with said conveyor chain and being positioned about that part of said conveyor chain which is in contact with said pulley, said conveyor chain and said driving chain being in contact only about said pulley, a driving sprocket engaged with said driving chain, said driving chain being formed of links, some of said links carrying projecting conveyor chain driving elements, said driving elements having conveyor engaging faces rearwardly inclined with respect to the direction of travel of said driving chain.

6. In combination, a conveyor and a drive therefor, said conveyor comprising a link chain, a pulley therefor, said conveyor being positioned about and in contact with a substantial proportion of the circumference of said pulley, a driving chain for said conveyor chain, said driving chain being positioned in contact with said conveyor chain and being positoned about that part of said conveyor chain which is in contact with said pulley, said conveyor chain and said driving chain being in contact only about said pulley, a driving sprocket engaged with said driving chain, said driving chain being formed of links, some of said links carrying projecting conveyor chain driving elements, said elements having rearwardly inclined conveyor engaging faces, one pitch of said conveyor chain being substantialy equal to two pitches of said driving chain.

7. In combination, in a conveyor drive suitable for driving a link chain conveyor, a pulley about which a driven conveyor chain is positioned and a driving chain positioned in contact with said driven chain, a driving sprocket and idler sprocket for said driving chain, said conveyor chain and said driving chain being in contact only about said pulley, driving members on said driving chain projecting outwardly therefrom in the direction of said pulley and projecting into driving engagement with said driven chain; said projecting members shaped with curved faces adapted to contact said driven chain, said curved faces being convex with respect to the direction of travel of said driving chain.

8. In combination, in a conveyor drive suitable for driving a link chain conveyor, a pulley about which a driven conveyor chain is positioned and a driving chain positioned in contact with said driven chain, a driving sprocket for said driving chain, and a take-up sprocket therefor, the said sprockets holding said driving chain in contact with said driven chain, and driving members on said driving chain projecting outwardly therefrom in the direction of said pulley and projecting into engagement with said driven chain; said projecting members shaped with curved faces adapted to contact said driven chain, said curved faces being convex with respect to the direction of travel from said driving chain.

9. In combination, a conveyor and a drive therefor, said conveyor comprising a link chain, an idler pulley therefor, said conveyor being positioned about and in contact with said pulley, a track, a plurality of trolleys engaged with said track and connected to said chain at spaced points, there being a link between each pair of trolley connections and a driving chain for said conveyor chain, said driving chain being positioned in contact with said conveyor chain and being positioned about said pulley, said conveyor chain and said driving chain being in contact only about said pulley a driving sprocket, engaged with said driving chain, said driving chain being formed of links, some of said links carrying conveyor chain engaging elements, and a movably mounted support for said driving chain and yielding means biased to resist movement of said support.

10. In combination, a conveyor and a drive therefor, said conveyor comprising a link chain, a pulley therefor, said conveyor being positioned about and in contact with said pulley, a track, a plurality of trolleys engaged with said track and connected to said chain at spaced points, there being a link between each pair of trolley connections and a driving chain for said conveyor chain, said driving chain being positioned about said pulley, a driving sprocket, engaged with the said driving chain, said driving chain being formed of links, some of said links carrying conveyor chain engaging elements, and a movably mounted support for said driving chain and yielding means biased to resist movement of said support, and means for varying the speed of said drive, said means comprising a connection between said driving chain support and said drive whereby movement of said support in either direction progressively varies the speed of said drive.

11. In combination, a conveyor and a drive therefor, said conveyor comprising a link chain, a pulley therefor, said conveyor being positioned about and in contact with said pulley, a track, a plurality of trolleys engaged with said track and connected to said chain at spaced points, there being a link between each pair of trolley connections and a driving chain for said conveyor chain, said driving chain being positioned about said pulley, a driving sprocket, engaged with the said driving chain, said driving chain being formed of links, some of said links carrying conveyor chain engaging elements, and a movably mounted support for said driving chain and yielding means biased to resist movement of said support, and means for varying the speed of said drive, said means comprising a connection between said driving chain support and said drive whereby movement of said support in either direction progressively varies the speed of said drive, and a limit switch positioned to be actuated by movement of said support and effective to stop said drive upon the completion of a predetermined amount of movement of said support.

References Cited in the file of this patent

UNITED STATES PATENTS

| | | |
|---|---|---|
| 1,817,970 | De Costa | Aug. 11, 1931 |
| 2,130,433 | Webb | Sept. 20, 1938 |
| 2,168,852 | Webb et al. | Aug. 8, 1939 |

FOREIGN PATENTS

| | | |
|---|---|---|
| 3,047 | Great Britain | July 28, 1876 |
| 131,165 | Germany | June 6, 1902 |
| 601,826 | Great Britain | May 13, 1948 |